United States Patent Office 3,235,581
Patented Feb. 15, 1966

3,235,581
CHLORINATED CYANOESTER
Peter L. De Benneville, Philadelphia, and Heinz W. Blessing, Levittown, Pa., assignors to Rohm & Haas Company, Philadelphia, Pa., a corporation of Delaware
No Drawing. Filed June 19, 1962, Ser. No. 203,461
4 Claims. (Cl. 260—465.4)

This application is a continuation-in-part of application Serial Number 834,410 filed August 18, 1959, now abandoned.

This invention deals with a specific halogenated cyanoester as a new composition of matter. It further deals with a method for the preparation of this specific halogenated cyanoester.

The compound of this invention is represented by the formula $$NCCH_2CH_2COOCH_2Cl$$

It is prepared by halogenating methyl 3-cyanopropionate preferably in the presence of a volatile inert non-polar organic solvent. It is preferred that it be a solvent for methyl 3-cyanopropionate but substantially not a solvent for the product nor for the by-product, hydrogen chloride, which is produced. It is also necessary that the solvent be one that will not be halogenated, such as carbon tetrachloride, hexachloroethane, other perchlorinated hydrocarbons and perfluorochlorinated hydrocarbons.

It is possible to employ the halogen in either the gaseous state or the liquid state, the gaseous state being somewhat preferred.

The process proceeds in the presence of actinic light and in the absence of added catalysts, although there may be employed a free radical catalyst, such as an azo compound or a peroxide, in order to achieve better control over the chlorination. Suitable in this respect are $\alpha,\alpha'$-azodiisobutyronitrile and other azo nitriles, benzoyl peroxide, phthaloyl peroxide, naphthoyl peroxide, substituted benzoyl peroxides, acetyl peroxide, caproyl peroxide, lauroyl peroxide, cinnamoyl peroxide, acetylbenzoyl peroxide, tert-butylhydroperoxide, di-tert-butyl peroxide, hydroxycyclohexyl hydroperoxide, cumene hydroperoxide, urea peroxide, oleoyl peroxide and triacetone peroxide. There may also be employed mixtures of the above catalysts. Generally, amounts in the range of about 0.1 to 5.0% or more may be employed as desired.

As a source of actinic light, there may be used daylight, an ordinary light bulb or spotlight, or ultraviolet light.

The reaction is conducted at a temperature of about 20° to 100° C., preferably at 50° to 95° C. It is frequently advantageous to conduct the reaction at the reflux temperature of the reaction mixture, within the aforementioned ranges.

As the reaction progresses, two layers are formed, of which the product usually is the upper layer. At the conclusion of the reaction, this layer is separated and distilled to get the product.

The product of this invention is particularly useful as a herbicide, especially against dicotyledonous plants. These compounds are most effective when employed in post-emergence applications according to standard procedures. The compound of this invention is also useful as a herbicide against monocotyledonous plants, particularly in post-emergence applications. Maximum results are observed when concentrations of about 7 to 10 pounds per acre are made as a spray, wettable powder, or dust in known inert carriers. The compound of this invention, particularly when applied according to standard procedures at a rate of 10 pounds per acre, is effective against mustard, wild carrot, sorrel, pigweed, lamb's-quarter, velvetleaf, curlydock, wild oats, millet, crabgrass and foxtail.

The present invention may be more fully understood from the following example which is offered by way of illustration and not by way of limitation. Parts by weight are used throughout.

*Example 1*

There are added to a reaction vessel 100 parts of methyl 3-cyanopropionate, 1 part of $\alpha,\alpha'$-azodiisobutyronitrile, and 400 parts of carbon tetrachloride. The reaction mixture is illuminated by a 200-watt spotlight placed six inches from the reaction mixture. Chlorine is passed in while the reaction mixture is heated at reflux (80° to 85° C.) for 2½ hours. After 80 minutes from the start of the reaction, another one part of $\alpha,\alpha'$-azodiisobutyronitrile is added. The amount of chlorine reacted is followed by absorbing the evolved hydrogen chloride in ½ normal aqueous sodium hydroxide solution. At the end of the chlorination, the reaction mixture is flushed with nitrogen for 35 minutes while the reaction mixture is still hot. The reaction mixture is cooled and separated into two layers. The upper organic layer is distilled using a 16" column packed with glass helices. The yield of chloromethyl-3-cyanopropionate is 88%. The product boils at 92° to 105° C. at 0.8 to 1.55 mm. absolute pressure. The product has an $n_D{}^{25}$ of 1.4533 and contains 40.56% carbon (40.69% theoretical), 4.02% hydrogen (4.10% theoretical), 24.34% chlorine (24.03% theoretical), and 9.41% nitrogen (9.49% theoretical).

When the same reaction is carried out in the absence of the $\alpha,\alpha'$-azodiisobutyronitrile, substantially the same yield of product is obtained, but slightly higher chlorine values indicate a small amount of less discriminated halogen substitution.

We claim:
1. As a composition of matter, the compound having the formula

$$NCCH_2CH_2COOCH_2Cl$$

2. A method for preparing a compound having the formula $$NCCH_2CH_2COOCH_2Cl$$

which comprises reacting methyl 3-cyanopropionate with chlorine in the presence of a volatile inert non-polar solvent and actinic light at a temperature of about 20° to 100° C.

3. A process according to claim 2 in which the temperature employed is about 50° to 95° C.

4. A process according to claim 2 in which there is employed a free radical catalyst.

References Cited by the Examiner
UNITED STATES PATENTS 2,444,478  7/1948  Teter et al. _____ 260—465.7
3,064,035  11/1962  De Benneville _____ 260—465.4

OTHER REFERENCES
Nazarov et al., C. A., vol. 49, page 6139 (1955).

CHARLES B. PARKER, *Primary Examiner.*